United States Patent [19]
Maruyama et al.

[11] 3,936,877
[45] Feb. 3, 1976

[54] TAPE TRANSPORT APPARATUS FOR CASSETTE TYPE TAPE RECORDER

[75] Inventors: Yoshio Maruyama; Yoshihiro Magata; Akihiro Fushimi; Yoshiharu Ueki; Katsuhisa Shimizu, all of Kawagoe, Japan

[73] Assignee: Pioneer Electronic Corporation, Tokyo, Japan

[22] Filed: Mar. 11, 1974

[21] Appl. No.: 450,265

[30] Foreign Application Priority Data
Mar. 9, 1973 Japan.......................... 48-29552[U]

[52] U.S. Cl. ...................... 360/96; 360/74; 360/93; 242/198
[51] Int. Cl.² ..................G11B 23/04; G11B 15/43; G11B 15/28
[58] Field of Search ........... 360/96, 93, 90, 105, 74; 242/197–200

[56] References Cited
UNITED STATES PATENTS

| | | | |
|---|---|---|---|
| 3,667,701 | 6/1972 | Blum | 360/96 |
| 3,759,529 | 9/1973 | Yoshii | 360/105 |
| 3,823,945 | 7/1974 | Milligan | 360/96 |

*Primary Examiner*—Alfred H. Eddleman
*Attorney, Agent, or Firm*—Sughrue, Rothwell, Mion, Zinn & Macpeak

[57] ABSTRACT

A cassette tape recorder has function of eliminating the slack of magnetic tape between supply reel and take-up reel in advance before the magnetic tape is started to transfer in the required direction for recording or reproducing. When the tape cassette is placed in "play" position, supply reel is rotated first in backward direction to eliminate the slack of the magnetic tape. The tensioned magnetic tape, then, may cause the take-up reel to rotate in the rewind direction. A detection device is provided to discriminate the rotation of the take-up reel in the backward direction. The detection device causes a control device for drive motor to switch the rotating direction of the motor so as to reverse the rotating direction of the capstan and the take-up reel.

2 Claims, 3 Drawing Figures

TAPE TRANSPORT APPARATUS FOR CASSETTE TYPE TAPE RECORDER

BACKGROUND OF THE INVENTION

The present invention is generally directed to a magnetic recording and reproducing apparatus utilizing a recording carrier container which is generally called "compact cassette."

In this type of tape cassette, magnetic tape is wound on hubs that are rotatably mounted in the tape container, and the magnetic tape has a tendency to loosen between the reel hubs during handling or tansportation accordingly. When the loosened tape cassette is operated with a recording and reproducing apparatus such as cassette type tape recorder, stable transport of the magnetic tape may not only be accomplished but also a malfunction, such as entanglement of the tape with pinch roller, may sometimes be encountered.

Accordingly, it is a main object of the present invention to provide a cassette tape recorder which is able to eliminate automatically the slack of the magnetic tape between the reel hubs before the tape starts to be driven in the predetermined direction at a constant speed.

In order to accomplish the object, in the cassette tape recorder of the present invention, there is provided an operation such that when a tape cassette is placed in the proper "play" position (defined as that position wherein a magnetic transducer head is in contact with the tape), and before the magnetic tape is pressed against the tape drive capstan with the pinch roller, the driving spindle for pay-out reel is rotated in the reverse direction to eliminate the slack between the pay-out reel and take-up reel, and when the predetermined tension to be given is detected, the magnetic tape is stated to transport at a constant speed in the required direction. Thus, the slack of the magnetic tape may be removed automatically before the constant speed transport of the tape, thereby, the disadvantage in the cassette tape recorder of the prior art may be eliminated.

The novel features which are considered as characteristic of the present invention as set forth in particular in the appended claims. The improved magnetic recording and reproducing aparatus itself, however, both as to its construction and its mode of operation, together with additional features and advantages thereof, will be best understood upon perusal of the following description of a specific embodiment with reference to the accompanying drawings.

DETAILED DESCRIPTION OF THE PREFERRED EMBODIMENT

Figure 1:
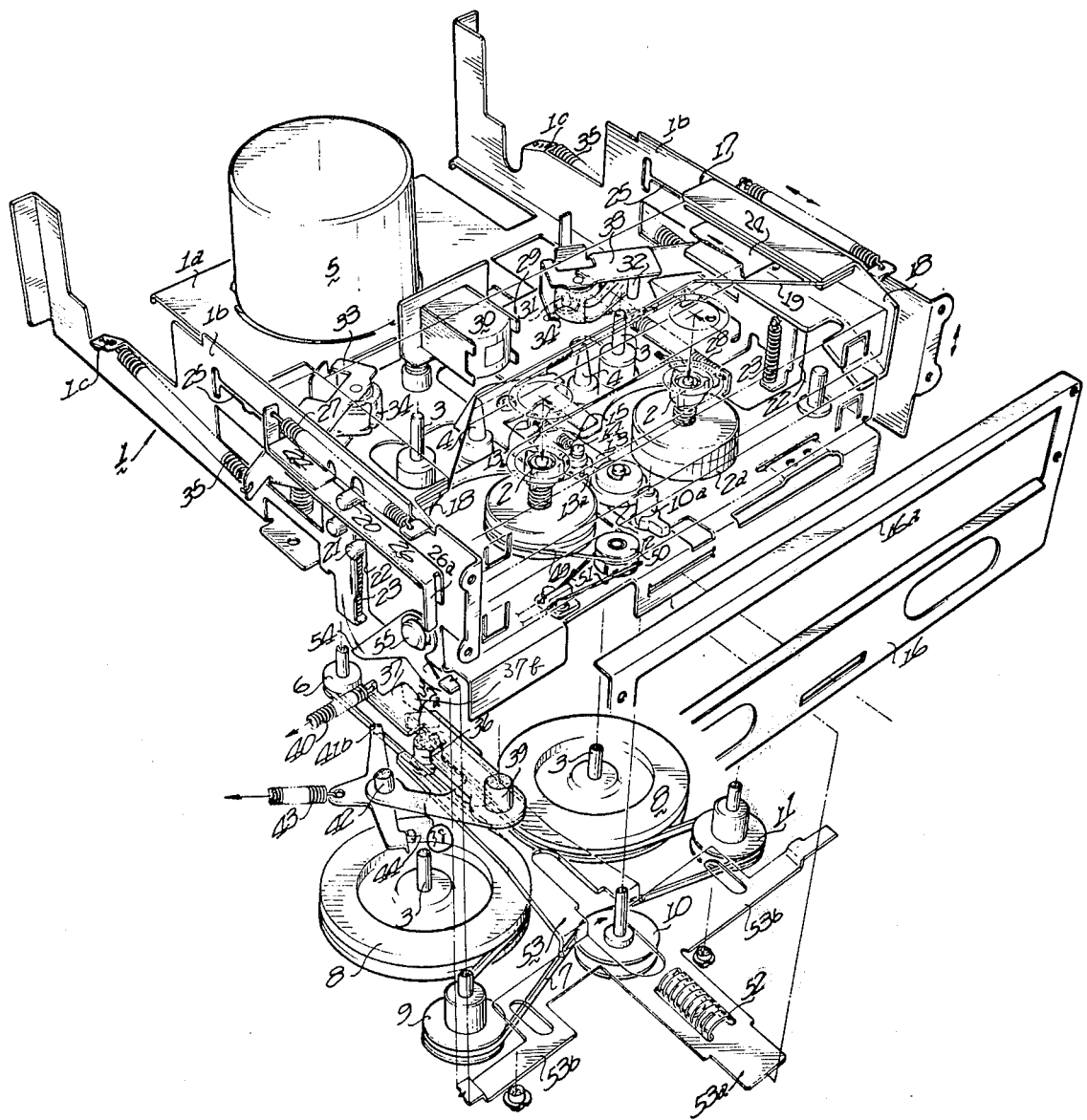
FIG. 1 illustrates a perspective view of the separated tape transport mechanism of a desirable embodiment of the invention.

Referring now to FIG. 1 in detail, there is shown a tape transport mechanism, in which reference numeral 1 shows a chassis comprising a bottom plate 1a and a pair of side plates 1b. On the bottom plate 1a, a pair of reel driving spindles 2 and a pair of tape driving capstans 3 are mounted rotatably in the interrelated positions. A pair of guide pins 4 secured on the bottom plate 1a serves as stopper for the tape cassette that is carried down to a predetermined position, and as the tape cassette is falling down, the reel driving spindles 2, 2 and the capstans 3, 3 are inserted and operatively engaged with the center holes of the reel hubs and the capstan receiving apertures of the tape cassette respectively.

Figure 2:
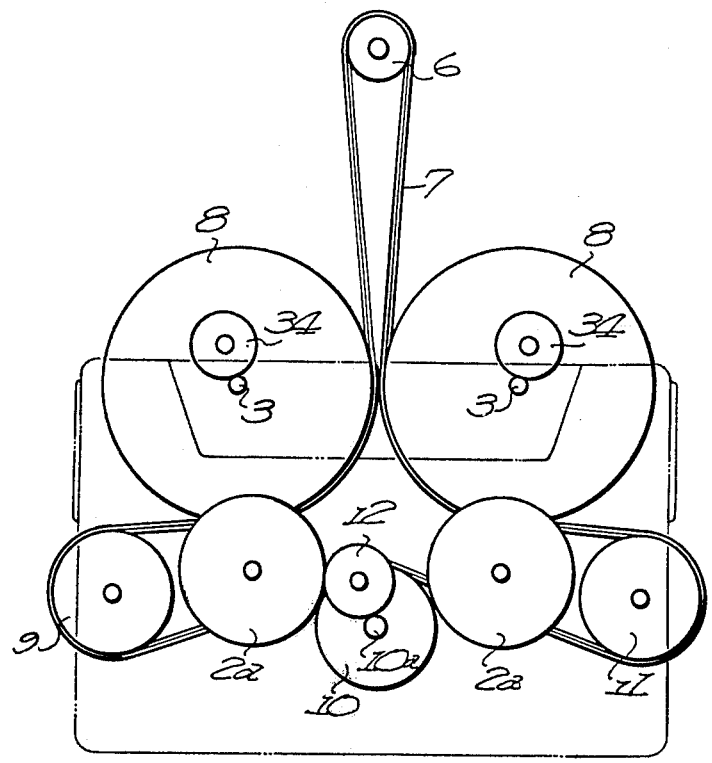
FIG. 2 illustrates a partial plan view of the tape transport mechanism shown in FIG. 1.

The bottom plate also includes a suitable motor 5 to drive the capstan 3, 3 and one of the reel driving spindle 2, 2 that rotates the take-up role. An elastic endless belt 7 is, as shown in FIG. 2, passed around the pulley 6 secured on the rotating shaft of the motor 5, a flywheel 8 mounting one of the capstans 3, thereon three pulleys 9, 10, 11 and another flywheel mounting another capstan 3 thereon. A rotating shaft 10a secured on the pulley 10 has an elongated portion extending upwardly through the bottom plate 1a, and an idle pulley 12 is positioned close to the elongated portion of the shaft 10a. The positon of the rotating shaft 10a is determined to be spaced equally from both the reel driving spindles 3, 3, and the idle pulley 12 is supported rotatably on one end of a lever 13 in the middle way between the peripheral surface of the clutch device 2a mounted the end portion of the reel driving spindle 2 and the peripheral surface of the clutch device 2a of another reel driving spindle 2. The lever 13 has near other distal end a slot 13a which is engaged slidably with a vertical pin 14, and also has a vertical tab portion 13b at the end thereof. The tab portion 13b engages with a slide plate, which will be described hereinafter, so that when no tape cassette is loaded, the idle pulley 12 is held in a spaced position from the rotating shaft 10a. However, when a tape cassette is inserted, the idle pulley 12 is shifted to engage with the rotating shaft 10a by the action of a spring 15 that is stretched between the pin 14 and the tab portion 13. While the idle pulley 12 is pressed against the rotating shaft 10a, the idle pulley 12 is also engaged with one of the clutch device 2a in accordance with the rotating direction of the shaft 10a, so that the rotation of the shaft 10a may be transmitted to the clutch device 2a by way of the idle pulley 12. When the rotating direction of the pulley 6 is reversed for recording or reproducing in another direction, the idle pulley 12 is shifted to the clutch device 2a of another side to cause it rotate.

A tape cassette to be loaded is inserted in the direction perpendicular to the reel hubs through an insertion aperture 16a of the front panel 16 attached the side plates 1b, with the open side, through which the magnetic tape is exposed, being in the forward direction. The tape cassette, after insertion through the insertion aperture 16a, is received on a lift deck 17. The lift deck 17 includes a pair of rails 18, 18 adapted to engage with the top and bottom surfaces of the inserted tape cassette at both and portions, and also includes an connecting plate 19 that connects the rails 18, 18 each other. These rails 18, 18 are positioned inside the side plates 1b, and each is provided on the outside surface thereof with a pair of pins 20, 21 extending outwardly through a slot 22 which is formed in the side plate 1b, being elongated in the direction parallel with the reel driving spindle. Accordingly the lift deck 17 can be moved down to the first position, in which the tape cassette may be held in "play" position, and up to a second position that is above the first position. The lift deck is biased to be held in the first position with spring 23 stretched between the rail 18 and the chassis 1. A movable member 24 of a plate is provided in a position abutting the front end portion of the tape cassette that is inserted along the rail 18 through the insertion aperture 16a. Both end portions of the movable member 24 are projected outwardly through slots 25 which are, in the side plates 1b, extended in the direction parallel with the direction of rail 18, and limiting members 26 are secured to the projected portions of the movable member 24. The movable member 24, therefore, can move along the slots 25 between the first position in which the tape cassette is inserted along the rail 18 half way to abut thereupon and the second position in which the tape cassette is positioned at the end of the rail 18. The movable member 24 is usually biased to be held in the first position with a spring 27 which is stretched between the limiting member 26 and the side plate 1b.

The limiting member 26 extends under the pin 20 in the direction parallel with the slots 25, and the front end portion thereof is bent downwards approximately perpendicularly forming bending portion 26a. Although the rail 18 is biased downwardly by the effect of the spring 23, the lift deck 17 can be held at the second position due to the limiting member 26 under the pin 20 for preventing the pin 20 from falling down. When the limiting member 26 is shifted from the first position to the second position by the further insertion of the tape cassette, the front end portion of the limiting member 26 is departed from the area under the pin 20 and may permit the lift deck 17 to go down from the second position to the first position. That is, the tape cassette inserted from the insertion aperture 16a proceeds laterally along the rail 18 to shift the movable member 24 from the first position to the second position, and then the tape cassette is moved down with the lift deck 17 to be set to the "play" position. In this state, the bending portion 26a of the limiting member 26 is abutting with the side portion of the pin 20 to hold the limiting member 26 and the movable member 24 in the second position until the lift deck 17 is lifted up to the second position. When the lift deck 17 goes down to the first position, an electric swtich device (not shown in the drawings) is operated to actuate the motor 5.

On the other hand, the bottom plate 1a mounts a carriage 29 which is movable between the first position close to the tape cassette, that is, the "play" position and the second position spaced from the first position, and the carriage 29 is biased in the first position by a spring 28. The carriage 29 has a magnetic transducer head 30, a pair of pinch rollers 34 held on a pair of supporting frames 33 respectively and a pair of stopper pins 31, each of which is in contact with the free end of each supporting frame 33 pivoted on a shaft 32 that is secured perpendicularly to the bottom plate 1a. Each supporting frame 33 holds each pinch roller 34 rotatably, and the rear end portion thereof extends outwardly through an aperture in the side plate 1b. The supporting frame 33 is biased by a spring 35 stretched between the lip portion 1c of the side plate 1b and the extended portion thereof so that the pinch roller 34 is biased toward the capstan 3. The lip portion 1c is desirably provided with a plurality of holes to adjust the tension of the spring 35 by selecting one of the holes to engage with the spring. The pin 31 contacting the supporting frame permits the supporting frame 33 to rotate so as to press the pinch roller 34 against the capstan 3 when the carriage 29 is in the first position, and the pin 31 serves to rotate the supporting frame 33 against the tension of the spring 35 so as to disengage the pinch roller 34 from the capstan 3 during the process in which the carriage 29 is shifted from the first position to the second position.

On the bottom surface of the carriage 29, there is provided a pin 36 which extends downwardly through the bottom plate 1a, and are provided at a pair of levers 37 and 38 which are rotatably mounted by a supporting shaft 39 on the bottom plate 1a. These levers 37 and 38 are positioned within the trajectory traced by movement of the pin 36. As shown in detail in FIG. 3, the first lever 37 is provided with a cutout 37a with which the pin 36 may engage so as to block the movement of the carriage 29 in the second position apart from the tape cassette, and the lever 37 is biased in the counterclockwise direction by a spring 40 so that the bottom surface of the cutout 37a thereof may abut upon the side surface of the pin 36. The second lever 38 has flat, V shape, and is rotatably mounted on the supporting shaft 39 at the apex of the V-shape. One free end portion having a slope cam portion of the lever 38 extend passing by the pin 36, and on the other free end a rotary lever 41 is pivoted by a pin 42. The rotary lever 41 has flat, T-shape and is actuated by a spring 43 stretched between the end portion of one arm thereof and the bottom plate 1a so that the free end portion having the slope cam portion of the lever contacts the pin 36. A contact portion 41a formed on the end of another arm of the rotary lever 41 is positioned to abut with a pin 44 secured on one of the flywheels 8 in FIG. 3, while a contact portion 41b formed on the end of the ramining arm of the lever 41 is positioned to abut with the side portion of the first lever 37. Accordingly, when the pin 44 is rotated in the counterclockwise direction in FIG. 3, causing the rotary lever 41 to rotate in the clockwise direction, the first lever 37 may be rotated in the clockwise direction and release the pin 36, and thus the carriage 29 may be shifted from the first position to the second position by the springs 28.

Figure 3:
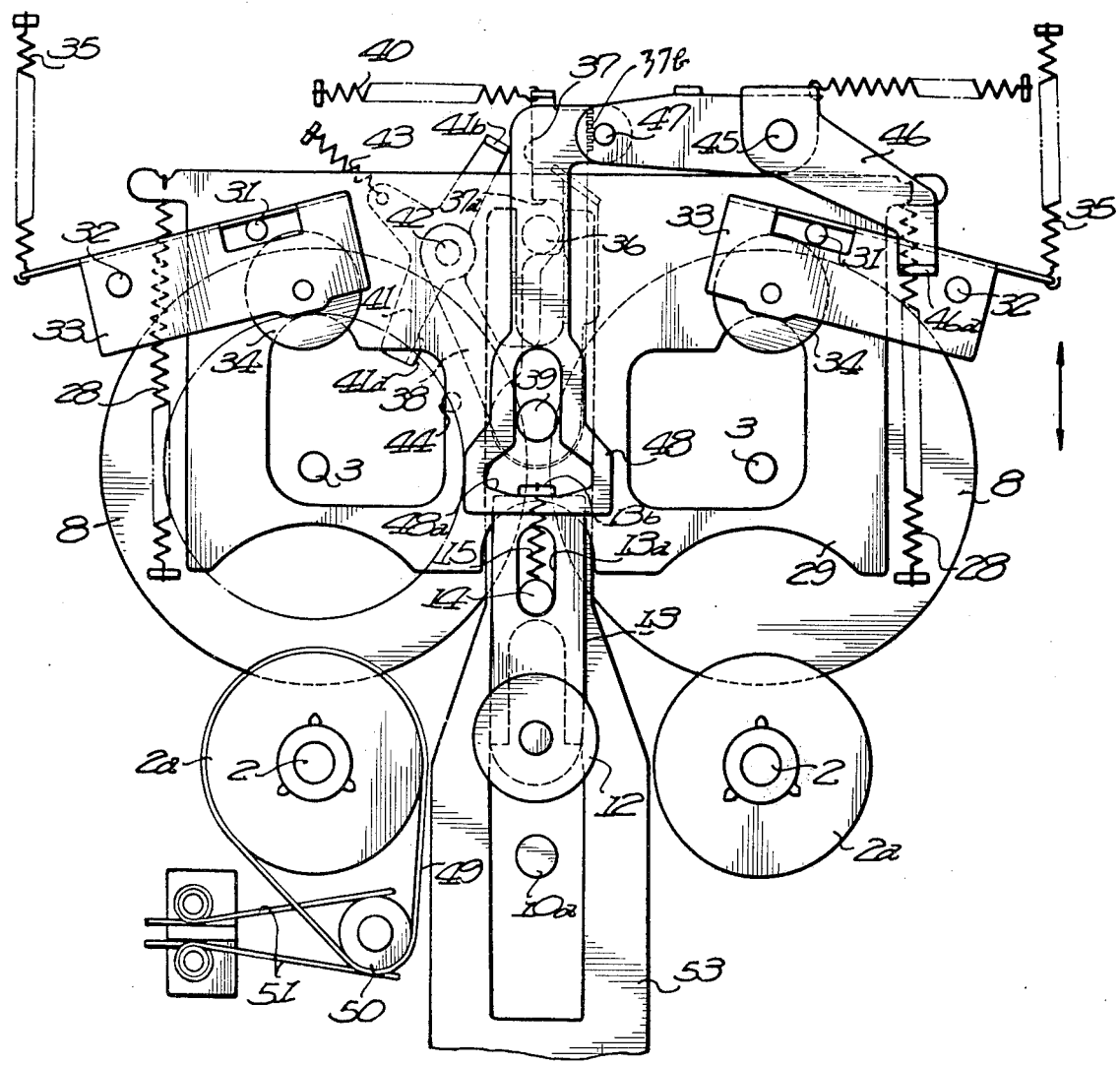
FIG. 3 illustrates another partial plan view of the tape transport mechanism shown in FIG. 1.

On the other hand, the movable member 24, moved by the insertion of the tape cassette along the rail 18 may abut with the contact portion 46a of a lever 46 rotatably mounted on the bottom plate 1a to cause it to rotate in the counterclockwise direction in FIG. 3, thereby permitting slide plate 48, pivoted on the other end of the lever 46 by a pin 47, to move in the opposite direction of the movable member 24. Th slide plate 48 includes a cutout 48a for receiving the tab portion 13a of the lever 13, which permits the lever 13 to move downwardly in FIG. 3 by the action of the spring 13 when it moves. As a result of the movement of the lever 13, the idle pulley 12 supported on the lever 13 will be operatively coupled to the rotating shaft 10a and to one of the clutch device 2a in accordance with the rotating direction of the rotating shaft 10a so that the rotation thereof can be transmitted to the clutch device 2a. The pin 47 is positioned to abut with the contact portion 37b of the lever 37 so that the pin 47 may block the first lever 37 to release the pin 36 when no cassette is inserted.

The control device not shown for the motor 5 includes a function that the rotor shaft of the motor 5 can be rotated first in the opposite direction against the direction required to play the tape cassette, so that the capstan 3 starts to rotate positively to the clockwise direction. Accordingly, in the first step where the tape cassette is received in the "play" position and the motor 5 is started to rotate (in the opposite direction against that is the stationary state), though the reel driving spindle for the supply reel rotates in the rewind direction, the pinch roller 34 may not be pressed against the capstan 3 due to the engagement of the pin 36 with the first lever 37. Thus, the slack of the magnetic tape between the supply and take-up reel can be eliminated immediately just as the condition after rewound. When the slack of the tape is eliminated, the take-up reel may be started to rotate in the rewind direction.

In order to detect that the take-up reel driving spindle 2 starts to rotate in the reverse direction, there is provided a detection drum 50 which is associated with the clutch device 2a by way of a belt 49. The detection drum 50 has a plurality of electrically conducting strips parellel to its longitudinal axis on its peripheral surface. A pair of electric conducting members 51, 51 are provided to put the detection drum between them and contact the conducting strips, thereby causing intermittent short-circuits when the detection drum rotates. When the predetermind number of short-circuits are counted, the control device for the motor 5 detects it and switches the direction of rotation of the motor 5. When the motor 5 rotates in the reverse direction and the pin 44 on the flywheel 8 may abut the contact portion 41a of the rotary lever 41, the rotary lever 41 may only be rotated in the counterclockwise direction.

However, when the motor 5 starts to rotate in the normal forward direction, the pin 44, in its rotating process, will abut with the contacting portion 41a of the rotary lever 41 causing it to rotate in the clockwise direction in FIG. 3. Thus, as described above, the rotation of the rotary lever 41 causes the first lever 37 to rotate permitting the pin 36 to disengage therewith, and then the carriage may be shifted from the second position to the first position resulting in establishment of the constant speed transport of the magnetic tape in the tape cassette. In this state, the second lever 38 contacting with the side portion of the pin 36 is rotated to the clockwise direction, and consequently the contacting portion 41a of the lever 41 pivoted on one end thereof will be held with disengaging outwardly with the moving range of the pin 44.

In order to retract the tape cassette held in the "play" position, an ejection lever 53 adapted on the bottom surface of the bottom plate 1a is slidable in the direction parallel with the direction of the carriage 29's movement and is biased in the same direction of the carriage 24 by a spring 52. The ejection lever 53 serves to shift the carriage 29 from the first position to the second position by way of the pin 36 engaging with its front end portion when the lever 53 is depressed inwardly against the tension of the spring 52 with a pushbutton secured on the projected end portion 53a of the lever 53. This ejection lever 53 is also provided with wing portions 53b on both sides perpendicularly to the lever 53, and wing portions 53b extend outwardly passing under the side plates 1b. On the side plates 1b, rotary members 54 are mounted rotatably with pins 55, which may be rotated by the end of the wing portions 53b when the ejection lever 53 is depressed inwardly. The free end of the rotary member 54 is positioned possibly to abut with the lower surface of the pin 21 secured to the rail 18. Accordingly, when the ejection lever 53 is depressed inwardly, the carriage 29 retracts so that the magnetic transducer head 30 disengages the aperture of the tape cassette and the pinch roller 34 is released from the capstan 3, while the free end of the rotary member 54 will push the pin 21 upwardly. Thus, the lift deck 17 will be elevated, and when the deck 17 reaches the second position, the pin 20 will disengage with the upper end of the bending portion 26 a of the limitting member 26, thereby permitting the limiting member 26 to go forwards with the movable member 24 by the action of the spring 27. By the advance of the movable member 24, the tape cassette may be ejected from the insertion aperture 16a along the rail 18, and the limiting member returned to the original position will abut with the lower surface of the pin 20 secured to the rail 18 to retain the lift deck 17 in the second position.

Although the present invention has been described with respect to a certain specific embodiment in which the tape cassette is inserted laterally with its aperture side forwards and then lifted downwardly in the direction parallel with the reel axis so as to be placed in the "play" position, it will be made by those skilled in the art without departing from the true spirit and scope of the present invention. In particular, although a dual capstan type cassette tape recorder has been described the present invention will find equal application in various type of cassette tape recorder.

What is claimed and desired to be secured by Letter Patent of the United States is:

1. A tape transport apparatus for cassette type tape recorder comprising:
    a. a lift deck means engaging a tape cassette, which is movable between a first position wherein the cassette is retained in a stationary position, and a second position which allows insertion or removal of the cassette from the tape recorder;
    b. means to move said lift deck means in a first direction from said first position to an intermediate position and in a second direction perpendicular to said first direction from said intermediate position to said second position;
    c. an electric motor for rotating a capstan and at least one reel driving spindle in the forward or backward direction;
    d. a carriage means supporting a magnetic transducer head means, said carriage movable between a first position wherein the transducer head is in contact with the tape in a cassette and a second position displaced from said first position by a predetermined distance;
    e. a pinch roller adapted to engage said capstan when said carriage means is in said first position;
    f. means to control said electric motor so as to rotate the supply reel in the backward or rewind direction when the lift deck means is placed in the first position;
    g. means for detecting the rotation of a take-up reel driving spindle in the backward direction so as to switch the rotating direction of said electric motor, and
    h. means for detecting the starting of rotation of said capstan in the forward direction to shift said carriage means from said second position to said first position.

2. A tape transport apparatus for cassette type tape recorder comprising:
    a. a lift deck means engaging a tape cassette, which is movable between a first position wherein the cassette is retained in a stationary position, and a second position which allows insertion or removal of the cassette from the tape recorder;

b. means to move said lift deck means in a first direction from said first position to an intermediate position and in a second direction perpendicular to said first direction from said intermediate position to said second position;

c. electric motor for rotating a capstan and at least one reel driving spindle in the forward or backward direction, d. carriage means supporting a magnetic transducer head means, said carriage movable between a first position wherein the transducer head is in contact with the tape in a cassette and a second position displaced from said first position by a predetermined distance, e. pinch roller means adapted to be pressed against said capstan when said carriage means is shifted from said second position to said first position, f. means to control said electric motor so as to rotate said reel driving spindle in the backward or rewind direction when the tape cassette is placed in the first position, g. means for detecting the rotation of a take-up reel driving spindle in the backward direction so as to switch the rotating direction of said electric motor, h. first lever means to be caused to rotate by contact with a pin secured to a fly wheel rotating with said capstan when said capstan is rotated in the forward direction, due to the switching of rotating direction of said motor, a predetermined angle, i. second lever means for retaining said carriage means in said first position by engagement with a pin secured to said carriage when said carriage means is in said first position, and for being moved to a position disengaging with said pin when said first lever means is rotated, and j. third lever means for shifting said first lever means to a position in which said first lever means is disengaged from said pin secured to said flywheel by engaging said pin secured to said carriage means when the carriage means is moved into said second position.

* * * * *